(12) United States Patent
Himmelhuber

(10) Patent No.: US 8,960,802 B2
(45) Date of Patent: Feb. 24, 2015

(54) VEHICLE SEAT WITH GUIDED SCISSOR ARMS

(75) Inventor: Frank Himmelhuber, Kuemmersbruck (DE)

(73) Assignee: Grammer AG, Amberg (DE)

( * ) Notice: Subject to any disclaimer, the term of this patent is extended or adjusted under 35 U.S.C. 154(b) by 550 days.

(21) Appl. No.: 13/305,487

(22) Filed: Nov. 28, 2011

(65) Prior Publication Data
US 2012/0133184 A1 May 31, 2012

(30) Foreign Application Priority Data

Nov. 29, 2010 (DE) .......................... 10 2010 052 619

(51) Int. Cl.
- *B60N 2/04* (2006.01)
- *B60N 2/08* (2006.01)
- *A47C 7/14* (2006.01)
- *B60N 2/16* (2006.01)
- *B60N 2/50* (2006.01)

(52) U.S. Cl.
CPC . *B60N 2/162* (2013.01); *B60N 2/50* (2013.01)
USPC ............ 297/452.18; 297/344.15; 297/344.17; 297/463.1; 248/421

(58) Field of Classification Search
USPC ............. 297/452.18, 344.15, 344.16, 344.17, 297/463.1, 344.12; 248/421
See application file for complete search history.

(56) References Cited

U.S. PATENT DOCUMENTS

| 203,739 | A | 5/1878 | Kilburn |
| 1,544,248 | A | 6/1925 | Liebl |
| 1,607,164 | A | 11/1926 | Leipert et al. |
| 1,945,801 | A | 2/1934 | Briggs |
| 1,948,476 | A | 2/1934 | Saurer |
| 2,489,981 | A | 3/1946 | Rose |
| 2,559,105 | A | 7/1951 | Banning, Jr. |
| 2,607,397 | A | 8/1952 | Schneider |
| 2,682,931 | A | 7/1954 | Young |
| 2,686,667 | A | 8/1954 | Willison et al. |
| 2,933,127 | A | 4/1960 | Brewster |
| 2,982,336 | A | * | 5/1961 | Minici .......................... 248/421 |

(Continued)

FOREIGN PATENT DOCUMENTS

| DE | 1480465 | 1/1970 |
| DE | 1405350 | 3/1970 |

(Continued)

OTHER PUBLICATIONS

Extended European Search Report for European Application No. 11191176.4, mailed Apr. 5, 2012.

(Continued)

*Primary Examiner* — David R Dunn
*Assistant Examiner* — Richard Lowry
(74) *Attorney, Agent, or Firm* — Sheridan Ross P.C.

(57) ABSTRACT

The invention concerns a vehicle seat with a seat upper part comprising a seat part and a back rest, and with a seat lower part, wherein between the seat upper part and the seat lower part is arranged a height-adjustable seat frame with at least two scissor arms connected rotatably together, wherein at least a first end of at least one of the scissor arms is connected with at least one slide element for sliding displacement of the first end in at least one displacement direction along at least one guide rail, wherein the slide element has at least one flexibly formed pressure force element to exert a pressure force directed against the guide rail.

10 Claims, 13 Drawing Sheets

(56) References Cited

U.S. PATENT DOCUMENTS

Figure 1:
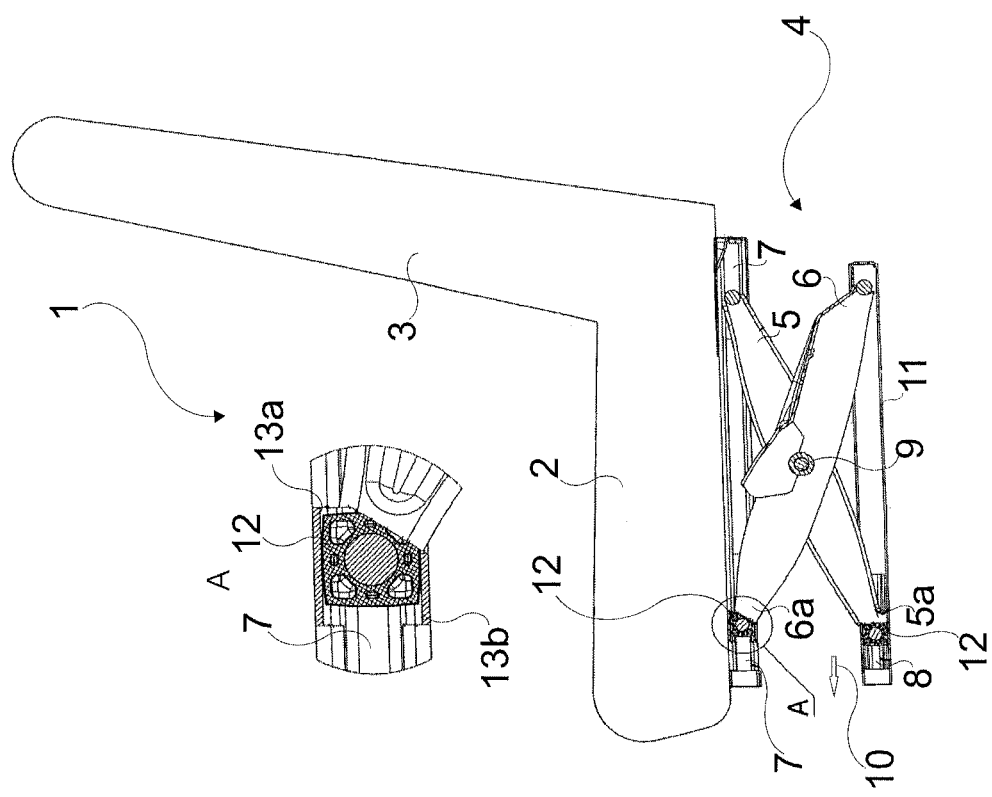

| | | | |
|---|---|---|---|
| 3,046,053 A | 7/1962 | Pearlstine | |
| 3,134,568 A | 5/1964 | Carson | |
| 3,208,085 A | 9/1965 | Grimshaw | |
| 3,298,654 A | 1/1967 | Dome | |
| 3,436,042 A | 4/1969 | Van Goubergen | |
| 3,578,376 A | 5/1971 | Hasegawa et al. | |
| 3,608,855 A | 9/1971 | Osenberg | |
| 3,697,128 A | 10/1972 | Strien et al. | |
| 3,724,603 A | 4/1973 | Shiomi et al. | |
| 3,752,432 A * | 8/1973 | Lowe | 248/564 |
| 3,756,556 A | 9/1973 | Georgi | |
| 3,765,676 A * | 10/1973 | Bearson et al. | 473/484 |
| 3,788,697 A | 1/1974 | Barton et al. | |
| 3,802,737 A | 4/1974 | Mertens | |
| 3,826,457 A * | 7/1974 | Huot de Longchamp | 248/564 |
| 3,847,338 A | 11/1974 | Adams | |
| 3,882,956 A | 5/1975 | Plegat | |
| 3,883,172 A | 5/1975 | Barton et al. | |
| 3,917,209 A | 11/1975 | Adams | |
| 3,982,718 A * | 9/1976 | Folkenroth et al. | 248/421 |
| 4,002,315 A | 1/1977 | Van Goubergen | |
| 4,022,411 A | 5/1977 | Rumsey | |
| 4,072,287 A * | 2/1978 | Swenson et al. | 248/574 |
| 4,125,242 A * | 11/1978 | Meiller et al. | 248/525 |
| 4,183,492 A | 1/1980 | Meiller | |
| 4,257,626 A | 3/1981 | Adomeit | |
| 4,273,213 A | 6/1981 | Munz | |
| 4,286,765 A * | 9/1981 | Delgleize et al. | 248/573 |
| 4,349,167 A | 9/1982 | Reilly | |
| 4,350,317 A * | 9/1982 | Aondetto | 248/588 |
| 4,440,441 A | 4/1984 | Marrujo et al. | |
| 4,461,444 A * | 7/1984 | Grassl et al. | 248/550 |
| 4,487,383 A | 12/1984 | Mazelsky | |
| 4,500,076 A | 2/1985 | Rova | |
| 4,519,591 A | 5/1985 | Bush et al. | |
| 4,529,158 A | 7/1985 | Sautter, Jr. | |
| 4,678,155 A | 7/1987 | Carter | |
| 4,679,760 A | 7/1987 | Dotzler et al. | |
| 4,685,731 A * | 8/1987 | Migut | 297/344.17 |
| 4,700,921 A * | 10/1987 | Holbrook | 248/421 |
| 4,714,227 A | 12/1987 | Holm et al. | |
| 4,784,434 A * | 11/1988 | Iwami | 297/216.1 |
| 4,842,257 A | 6/1989 | Abu-Isa et al. | |
| 4,856,763 A * | 8/1989 | Brodersen et al. | 267/131 |
| 4,859,148 A | 8/1989 | Hibyan | |
| 4,911,381 A | 3/1990 | Cannon et al. | |
| 4,927,119 A | 5/1990 | Frost | |
| 4,954,051 A | 9/1990 | Smith et al. | |
| 4,958,812 A | 9/1990 | Wolf et al. | |
| 5,004,206 A | 4/1991 | Anderson | |
| 5,014,960 A | 5/1991 | Kimura | |
| 5,042,783 A | 8/1991 | Ciolczyk et al. | |
| 5,054,753 A | 10/1991 | Polus | |
| 5,087,503 A | 2/1992 | Meatto | |
| 5,123,625 A | 6/1992 | Spaltofski | |
| 5,127,699 A | 7/1992 | Maezawa et al. | |
| 5,194,111 A | 3/1993 | Meatto | |
| 5,211,369 A * | 5/1993 | Hoerner | 248/588 |
| 5,221,071 A | 6/1993 | Hill | |
| 5,222,709 A | 6/1993 | Culley, Jr. et al. | |
| 5,251,864 A * | 10/1993 | Itou | 248/588 |
| 5,324,095 A | 6/1994 | Yamauchi | |
| 5,331,750 A | 7/1994 | Sasaki et al. | |
| 5,338,090 A | 8/1994 | Simpson et al. | |
| 5,344,210 A | 9/1994 | Marwan et al. | |
| 5,358,210 A | 10/1994 | Simon et al. | |
| 5,368,118 A | 11/1994 | Hoefle | |
| 5,437,494 A | 8/1995 | Beauvais | |
| 5,449,218 A | 9/1995 | Beauvais et al. | |
| 5,531,404 A | 7/1996 | Marechal | |
| 5,553,911 A | 9/1996 | Bodin et al. | |
| 5,555,501 A | 9/1996 | Furihata et al. | |
| 5,632,208 A | 5/1997 | Weber | |
| 5,651,585 A | 7/1997 | Van Duser | |
| 5,657,950 A | 8/1997 | Han et al. | |
| 5,676,424 A * | 10/1997 | Winkelhake | 297/337 |
| 5,730,492 A | 3/1998 | Warrick et al. | |
| 5,743,592 A | 4/1998 | Bedouch | |
| 5,758,859 A | 6/1998 | Gonzalez | |
| 5,871,198 A * | 2/1999 | Bostrom et al. | 248/588 |
| 5,871,257 A | 2/1999 | Dundes, Sr. | |
| 5,899,288 A | 5/1999 | Schubert et al. | |
| 5,967,604 A | 10/1999 | Yoshida | |
| H001833 H | 2/2000 | Hoppel et al. | |
| 6,286,821 B1 | 9/2001 | Schaffer | |
| 6,309,020 B1 * | 10/2001 | Niikura et al. | 297/344.1 |
| 6,354,556 B1 | 3/2002 | Ritchie et al. | |
| 6,412,864 B1 | 7/2002 | Larson | |
| 6,478,102 B1 | 11/2002 | Puterbaugh et al. | |
| 6,554,359 B2 * | 4/2003 | Kohl et al. | 297/338 |
| 6,582,015 B2 | 6/2003 | Jessup et al. | |
| 6,595,570 B2 | 7/2003 | Susko | |
| 6,725,983 B2 | 4/2004 | Bell | |
| 6,758,294 B2 | 7/2004 | Peddycord et al. | |
| 6,773,049 B2 | 8/2004 | Rupiper et al. | |
| 6,857,674 B2 | 2/2005 | Chareyre | |
| 6,935,693 B2 * | 8/2005 | Janscha et al. | 297/344.15 |
| 7,017,888 B2 | 3/2006 | Platner et al. | |
| 7,044,553 B2 | 5/2006 | Ropp | |
| 7,077,226 B2 | 7/2006 | Oliver et al. | |
| 7,077,227 B2 | 7/2006 | Oliver et al. | |
| 7,080,881 B2 | 7/2006 | Williamson et al. | |
| 7,185,867 B2 * | 3/2007 | Hill et al. | 248/421 |
| 7,201,367 B2 | 4/2007 | Wietharn | |
| 7,240,754 B2 | 7/2007 | Barta et al. | |
| 7,300,100 B2 | 11/2007 | McLean et al. | |
| 7,331,627 B2 | 2/2008 | Van Den Brink et al. | |
| 7,338,126 B2 | 3/2008 | Ropp | |
| 7,452,019 B1 | 11/2008 | Day | |
| 7,469,861 B2 | 12/2008 | Ferry et al. | |
| 7,478,879 B2 | 1/2009 | Robinson | |
| 7,484,805 B2 * | 2/2009 | Baum | 297/344.15 |
| 7,568,675 B2 * | 8/2009 | Catton | 248/588 |
| 7,744,149 B2 | 6/2010 | Murray et al. | |
| 7,882,914 B2 | 2/2011 | Scheele et al. | |
| 7,883,135 B2 | 2/2011 | Ravid et al. | |
| 7,886,882 B2 * | 2/2011 | Behmenburg et al. | 188/282.4 |
| 7,950,726 B2 | 5/2011 | Brown | |
| 7,997,600 B2 | 8/2011 | Haller et al. | |
| 8,061,770 B2 | 11/2011 | Houston et al. | |
| 8,095,268 B2 | 1/2012 | Parison et al. | |
| 8,182,038 B2 | 5/2012 | Haller | |
| 8,186,475 B2 | 5/2012 | Sugden et al. | |
| 8,225,903 B2 | 7/2012 | Dunn | |
| 8,226,163 B1 | 7/2012 | Pearson et al. | |
| 8,261,869 B2 | 9/2012 | Turco et al. | |
| 8,265,832 B2 | 9/2012 | Haller et al. | |
| 8,469,450 B2 * | 6/2013 | Wahls et al. | 297/344.17 |
| 8,662,588 B1 * | 3/2014 | Delmestri | 297/344.16 |
| 2002/0033622 A1 | 3/2002 | Jarnail et al. | |
| 2004/0090100 A1 * | 5/2004 | Igarashi | 297/344.15 |
| 2005/0051373 A1 | 3/2005 | Bernhardt et al. | |
| 2005/0224269 A1 | 10/2005 | Dahl | |
| 2006/0061022 A1 | 3/2006 | Chang et al. | |
| 2006/0208401 A1 | 9/2006 | Reast | |
| 2006/0237885 A1 | 10/2006 | Paillard et al. | |
| 2006/0255639 A1 * | 11/2006 | Ropp | 297/344.15 |
| 2008/0164746 A1 * | 7/2008 | Dozsa-Farkas | 297/463.1 |
| 2008/0197684 A1 * | 8/2008 | Ott et al. | 297/344.16 |
| 2009/0045000 A1 | 2/2009 | Brown | |
| 2009/0205880 A1 | 8/2009 | Hammonds | |
| 2009/0284061 A1 | 11/2009 | Maier et al. | |
| 2010/0006364 A1 | 1/2010 | Koutsky et al. | |
| 2010/0117428 A1 * | 5/2010 | Deml et al. | 297/344.15 |
| 2010/0213345 A1 | 8/2010 | Haller | |
| 2010/0276211 A1 | 11/2010 | Kolb et al. | |
| 2010/0289312 A1 | 11/2010 | Burr et al. | |
| 2011/0001342 A1 * | 1/2011 | Deml et al. | 297/338 |
| 2011/0226930 A1 * | 9/2011 | Enns et al. | 248/569 |
| 2011/0233975 A1 | 9/2011 | Mindel et al. | |
| 2011/0278894 A1 * | 11/2011 | Lorey | 297/344.15 |
| 2012/0007293 A1 | 1/2012 | Bauer et al. | |
| 2012/0025577 A1 * | 2/2012 | Kolb | 297/344.13 |
| 2012/0032379 A1 | 2/2012 | Kolb | |

(56) References Cited

U.S. PATENT DOCUMENTS

| | | |
|---|---|---|
| 2012/0043798 A1 | 2/2012 | Haller et al. |
| 2012/0049602 A1 | 3/2012 | Kaessner |
| 2012/0091773 A1* | 4/2012 | Lorey ................. 297/344.19 |
| 2012/0145875 A1 | 6/2012 | Haller et al. |
| 2012/0153551 A1 | 6/2012 | Kolb |
| 2013/0069409 A1 | 3/2013 | Kolb |

FOREIGN PATENT DOCUMENTS

| | | |
|---|---|---|
| DE | 1480188 | 3/1970 |
| DE | 2309808 | 9/1973 |
| DE | 2317824 | 10/1973 |
| DE | 7419891 | 10/1974 |
| DE | 2537174 | 8/1975 |
| DE | 7731339 | 1/1978 |
| DE | 2816616 | 10/1979 |
| DE | 141769 | 5/1980 |
| DE | 3003175 | 8/1981 |
| DE | 3208680 | 3/1982 |
| DE | 3237167 | 4/1984 |
| DE | 3517345 | 11/1986 |
| DE | 3890533 | 10/1989 |
| DE | 3901898 | 7/1990 |
| DE | 9312640 | 1/1994 |
| DE | 197 44 199 C2 | 9/1997 |
| DE | 19907658 | 2/1999 |
| DE | 19744199 | 4/1999 |
| DE | 19919697 | 11/2000 |
| DE | 19945841 | 4/2001 |
| DE | 10129127 | 1/2003 |
| DE | 10206223 | 9/2003 |
| DE | 10300876 | 7/2004 |
| DE | 102005028725 | 1/2005 |
| DE | 102005023088 | 6/2006 |
| DE | 60304643 | 4/2007 |
| DE | 102006030008 | 4/2007 |
| DE | 102008063812 | 4/2007 |
| DE | 112006002984 | 10/2008 |
| DE | 102007027320 | 1/2009 |
| DE | 103 00 876 B4 | 4/2009 |
| DE | 102008023120 B4 | 6/2010 |
| DE | 102010051326 | 3/2012 |
| EP | 0284365 | 9/1988 |
| EP | 1400398 | 3/2004 |
| EP | 1577156 | 9/2005 |
| EP | 1652724 | 5/2006 |
| FR | 2352686 | 12/1977 |
| GB | 1401881 | 8/1975 |
| GB | 1432614 | 4/1976 |
| GB | 1587637 | 4/1981 |
| GB | 2438090 | 11/2007 |
| WO | WO 92/04224 | 3/1992 |
| WO | WO 92/09451 | 6/1992 |
| WO | WO 98/32627 | 7/1998 |
| WO | WO 03/063650 | 8/2003 |
| WO | WO 2007/058572 | 5/2007 |

OTHER PUBLICATIONS

German Office Action prepared on Jun. 29, 2011, for German Application No. 10 2010 052 619.3.

* cited by examiner

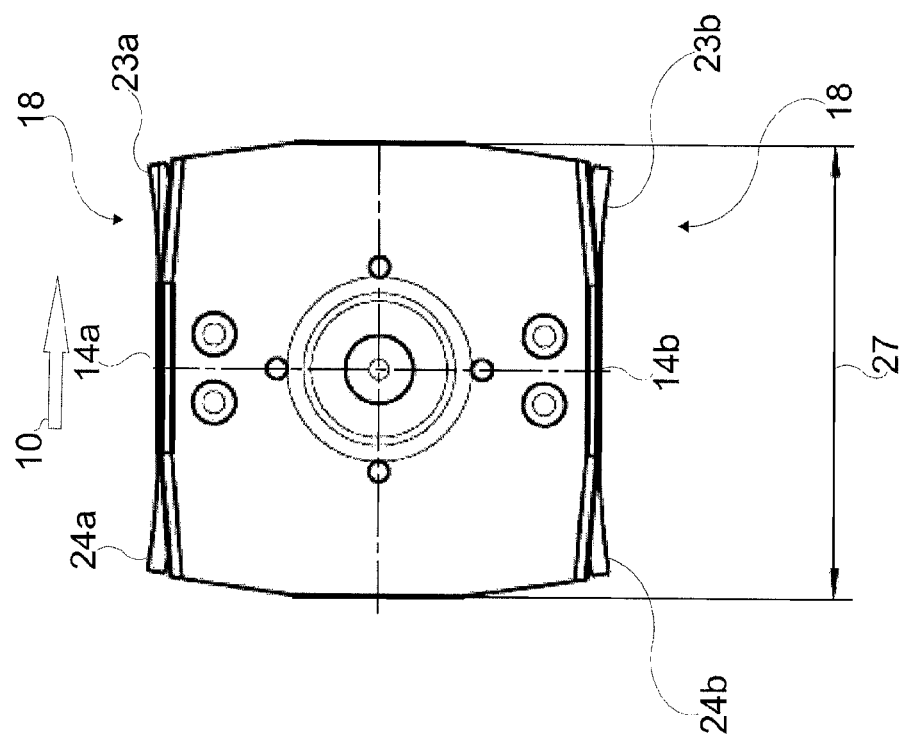

VEHICLE SEAT WITH GUIDED SCISSOR ARMS

CROSS REFERENCE TO RELATED APPLICATIONS

This application claims the benefit of German Application No. 10 2010 052 619.3 filed Nov. 29, 2010, the entire disclosure of which is incorporated herein by reference.

DESCRIPTION

The invention concerns a vehicle seat with a seat upper part comprising a seat part and a back rest, and with a seat lower part, wherein between the seat upper part and the seat lower part is arranged a height-adjustable seat frame with at least two scissor arms connected rotatably together, according to the preamble of claim 1.

Conventionally vehicle seats often have height-adjustable seat frames which are composed of two or more scissor arms. Here the scissor arms are pivoted together in their middle section so that they can be extended upwards and downwards, which at the same is associated with a displacement of at least one end of each scissor arm, preferably in the horizontal direction.

Such a displacement in a preferably horizontally oriented displacement direction takes place such that the scissor arms, at least at one of their ends, have rollers running within a guide rail which also runs preferably horizontally and is connected firstly with the seat upper part and secondly with the seat lower part. Such an attachment of rollers has the disadvantage that these are costly to produce as they often must be made of metal or plastic with metal bearings and connected with the ends of the scissor arms by means of several mounting steps. Also on wear of the rollers and/or guide rails, which are frequently formed U-shaped in cross section and surround the rollers, the rollers must be replaced in a lengthy and cost-intensive process.

A further disadvantage is that the rollers together with the guide rails must be produced with high fit precision in order to ensure an almost clearance-free rolling of the rollers within the guide rails, and thus make the vehicle seat safe in traffic in the event of an accident.

It is also known that on wear of the rollers or other elements moving within the guide rails, the fit precision present initially no longer exists and therefore the rollers and guide rails interact with greater clearance. This leads to rattling noises from unoccupied passenger seats when the vehicle is moving, as the rollers or other elements to be guided in the guide rails wobble when travelling over uneven ground.

Thus the object of the invention is to provide a vehicle seat with a seat upper part and seat lower part and a seat frame arranged in between, which allows economic and rapid production of a seat frame held between the seat upper part and seat lower part and ensures a permanently clearance-free arrangement of the seat frame in the guide rails of the vehicle seat.

This object is achieved according to the features of claim 1.

An essential point of the invention is that in a vehicle seat with a seat upper part comprising a seat part and a back rest and with a seat lower part, wherein between the seat upper part and seat lower part is arranged a height-adjustable seat frame with at least two scissor arms connected rotatably together, at least a first end of at least one of the scissor arms is connected with at least one slide element for sliding displacement, at least in one displacement direction, of the first end along at least one guide rail, wherein the slide element has at least one flexibly formed pressure force element to exert a pressure force directed against the guide rail. By arranging slide elements with such pressure force elements that are preferably made of flexible material, an economic and rapid production of the seat frame is possible which is to be arranged with the slide elements inside the guide rails, and in connection with the pressure force element a clearance-free arrangement of the seat frame with the slide elements inside the guide rails is possible even after a long period of wear. This helps to avoid rattling noises which would be caused by the slide elements even if the seat is unoccupied and at the same time the vehicle is travelling over an uneven road surface. These slide elements are preferably made of plastic.

Advantageously such a slide element comprises at least one element substantially cuboid-shaped, wherein this element with at least two opposing first surfaces slides along slide faces of the guide rails, which have preferably an U-shaped cross section profile. By this arrangement of such cuboid-shaped slide elements inside the U-shaped guide rails, a high security against detachment of the ends of the scissor arms from the guide rails is guaranteed even if for example a severe collision accident occurs. The U-shaped cross section profiles border the cuboid-shaped slide element at its upper and lower sides which constitute first surfaces and can even have profiles drawn downwards at the sides so that also a lateral slipping out of the slide elements, i.e. transverse to the displacement direction, is no longer possible.

According to a preferred embodiment the first surfaces are structured such that each first surface has a first face arranged in a middle section of the first surface and, viewed in displacement direction, at least one first wing-like pressure force element arranged after the first face and at least one second wing-like pressure force element arranged before the first face are arranged. Such pressure force elements allow the slide element to be pressed away from the inner sides of the guide rails i.e. away from the top inner side and away from the bottom inner side of the guide rail.

Also by arranging a first and second pressure force element before and after the first face, it is achieved that even during displacement of the slide element or after displacement of the slide element within the guide rail, a slightly angled twisted or offset position of the slide element can occur which corresponds to a tilted position in displacement direction or against the displacement direction, but nonetheless a clearance-free contact of the pressure force elements on the top and bottom inner faces of the guide rails is ensured. Thus there is a clearance-free positioning of the slide element within the guide rail.

The first and second wing-like pressure force elements have plate elements which are slightly curved in the longitudinal and transverse direction of the guide rails and which have a first free end pressing against the guide rail and a second end fixed to the slide element. Such plate elements are thus formed wing-like and because of their material properties—the material being primarily plastic—allow a pre-tension against the inner side of the guide rail. The pre-tension of the wing-like plate element is achieved by the slightly curved form in which the free end is oriented in the direction of the inner side of the guide rail.

The first surfaces are structured such that each first surface viewed in the displacement direction has at least one second flat or arcuated face arranged after the first face, and at least one third flat or arcuated face arranged before the first face. Here the two second faces and the two third faces each border peripherally one of the flexibly formed pressure force elements.

Alternatively a second face and a third face can be bordered by two pressure force elements. It is also conceivable that only pressure force elements but not second and third faces are provided. For this the pressure force element could also be oriented transverse to the displacement direction of the slide element such that a free end of the pressure force element is oriented in a transverse direction of the guide rail and tilted upwards.

The second face or faces—viewed in displacement direction—is/are formed sloping from the first face towards a first end of the first surface. The third face or faces however—viewed against the displacement direction—is/are formed sloping from the first face towards a second end of the first surface.

This design of such second and third faces prevents any jamming of the cuboid-shaped slide element on displacement of the slide element in the forward and reverse direction i.e. in and against the displacement direction.

Rather because of these chamfered second and third faces, a blocking of the slide element inside the guide rails is avoided even on rapid displacement in the displacement direction, since on a forward displacement the slide element slides on the upper second face and the lower third face due to a slight twist of the pivot-mounted slide element, and on a backward displacement slides on the upper third face and lower second face. This leads to the slide element not seizing and not bucking, as could occur on jamming of a precisely cuboid-shaped element, insofar as little clearance exists between the slide faces of the guide rail and the slide element. Thus a slight twist of the slide element, which is arranged rotatable on the first end of one scissor arm by means of an axis running vertical to the guide rail, prevents jamming and bucking during the slide movement.

According to a refinement of the invention the first and/or second and/or third faces viewed perpendicular to the displacement direction, starting from the middle section of the surface, have faces sloping towards peripheral regions of the element. As a result an undesirable sideways tilting of the slide element can be avoided. Such a sloping of the faces is applied primarily to the first face.

The second and third faces can be arranged as flat faces with an angle in the range of 0.05° to 5.0° in relation to a plane of the slide surface of the guide rail. The order of magnitude of such an angle, of which 0.2° is the preferred angular measure, has proved suitable as firstly the block-free sliding of the slide element is possible within the guide rails which border the slide element at least on the upper or lower side, and secondly as little clearance as possible is ensured between the slide surfaces of the guide rails and the surfaces of the slide element even in a sliding state.

According to one embodiment the first surfaces can be designed such that each first surface has two flat faces which—viewed in displacement direction—sloping from a middle section of the first surface to a first and second end of the first surface. Here in contrast to the embodiments described above with a first, second and third face, larger slide part faces are available on a slide movement and thus there is less wear than in the embodiment described above. However it is a disadvantage here that a greater clearance must exist between the sliding surfaces of the guide rails and the surface of the slide element as the angle between the faces and a plane of the sliding surface of the guide rail must be selected from the range of 0.1° to 15.0° to guarantee a good function of the slide movement.

According to a further embodiment the pressure force element in the unloaded state can be arranged at least partly spaced with a distance of 0.3 to 3 mm, preferably 0.6 mm, from a plane spanned by the first face, and pointing away from the slide element. This distance ensures that there is always adequate clearance between the slide element and the guide rail—even with risk of jamming—and at the same time nonetheless the pressure force elements ensure a play-free sliding of the slide element along the guide rail. This can also apply if the slide element has a tendency to jam by tilting on a forward or backward displacement or when sliding to the left or right.

The slide element can have over its entire width a wing-like pressure force element before the slide surface and a wing-like pressure force element after the slide surface without further slide surfaces being present before and after the first slide surface.

It is also conceivable that before and after the first slide surface, a second and a third slide surface are present but these are arranged only in the centre—viewed in the width direction of the slide element—and a wing-like pressure force element is present to the left and right thereof. Thus in total four wing-like pressure force elements are arranged on a top of the slide element and four on the bottom of the slide element.

It is also conceivable that the wing-like pressure force elements extend in the transverse direction of the slide element and the guide rail and not in the longitudinal direction of the slide element and guide rail. For this in each case one or more of the wing-like pressure force elements—viewed in displacement direction—are arranged after the first slide surface. The free ends of the wing-like pressure force elements can be pointed towards the inner side of the vehicle seat or towards the outside. It is also conceivable that the free ends are oriented both towards the inner side and towards the outer side on the top and bottom of the slide element.

The slide elements are each mounted on at least one axis running perpendicular to the guide rail and formed preferably horizontal, on the first end of the rotatable scissor arm, and engage in a recess provided for this preferably centrally in the slide element which need not necessarily extend throughout the entire slide element but for example extends only to the halfway width of the slide element.

Further advantageous embodiments arise from the sub claims.

Figure 2:
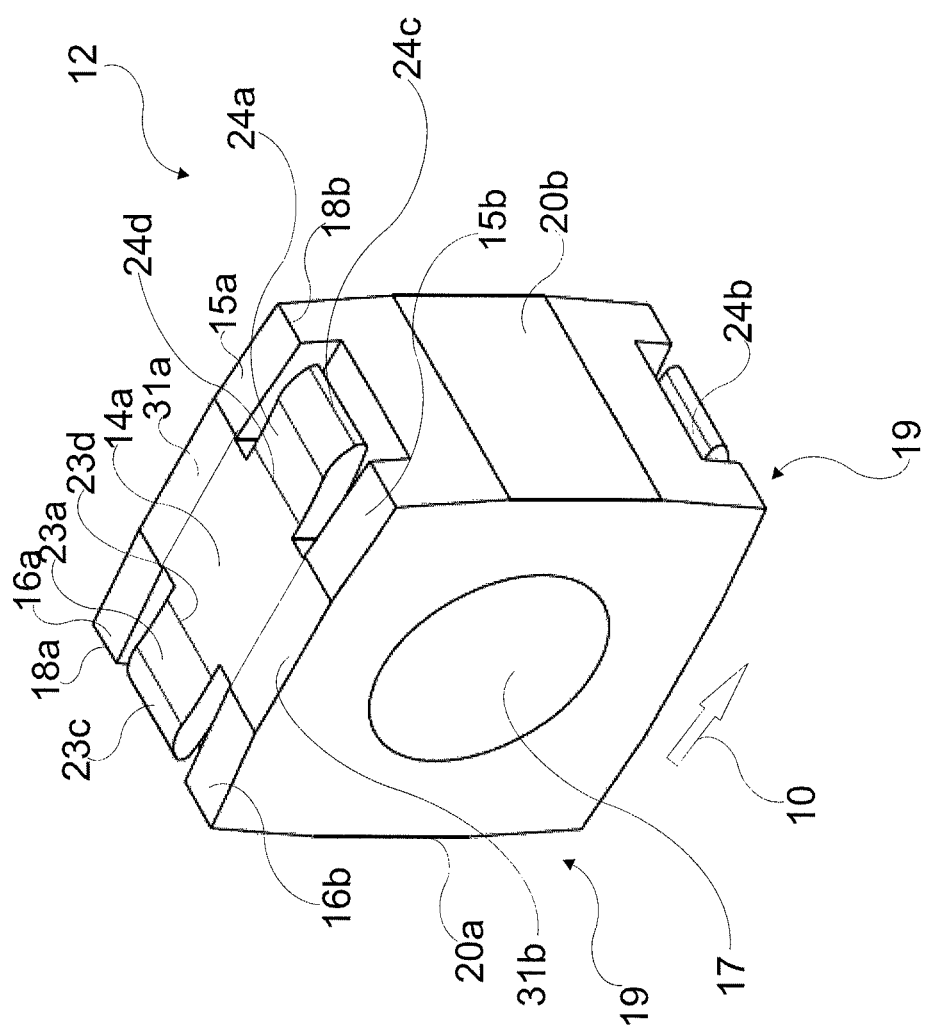
Figure 3:
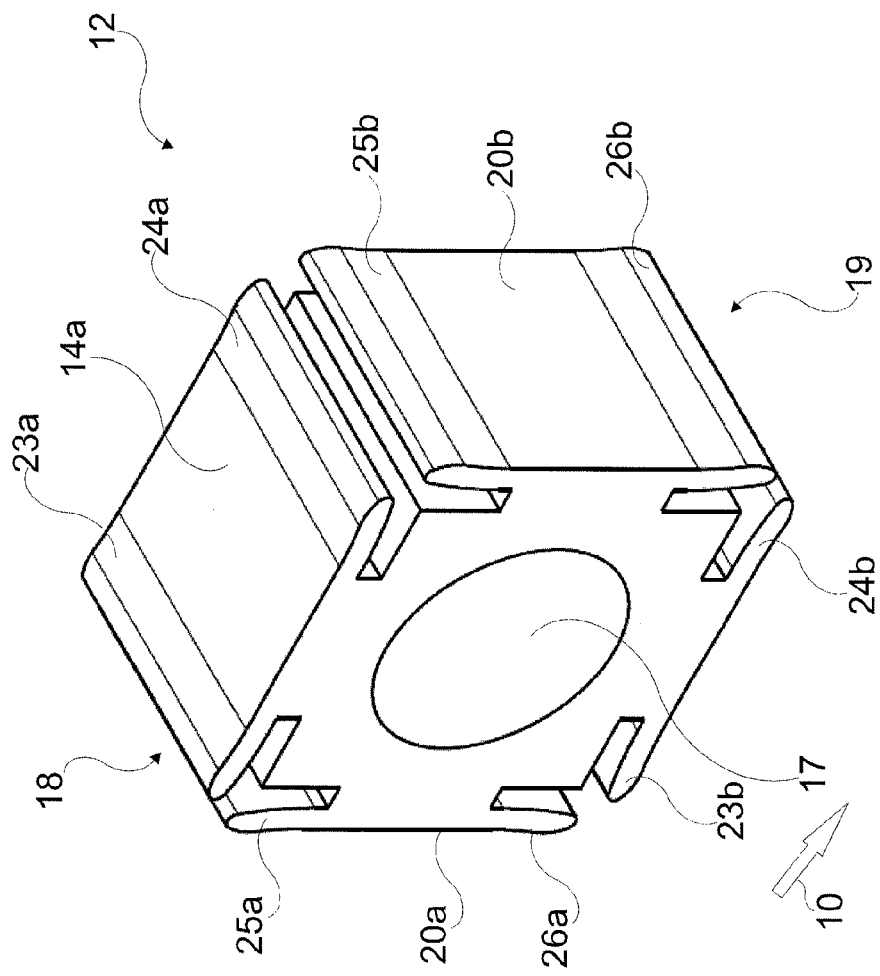
Figure 4:
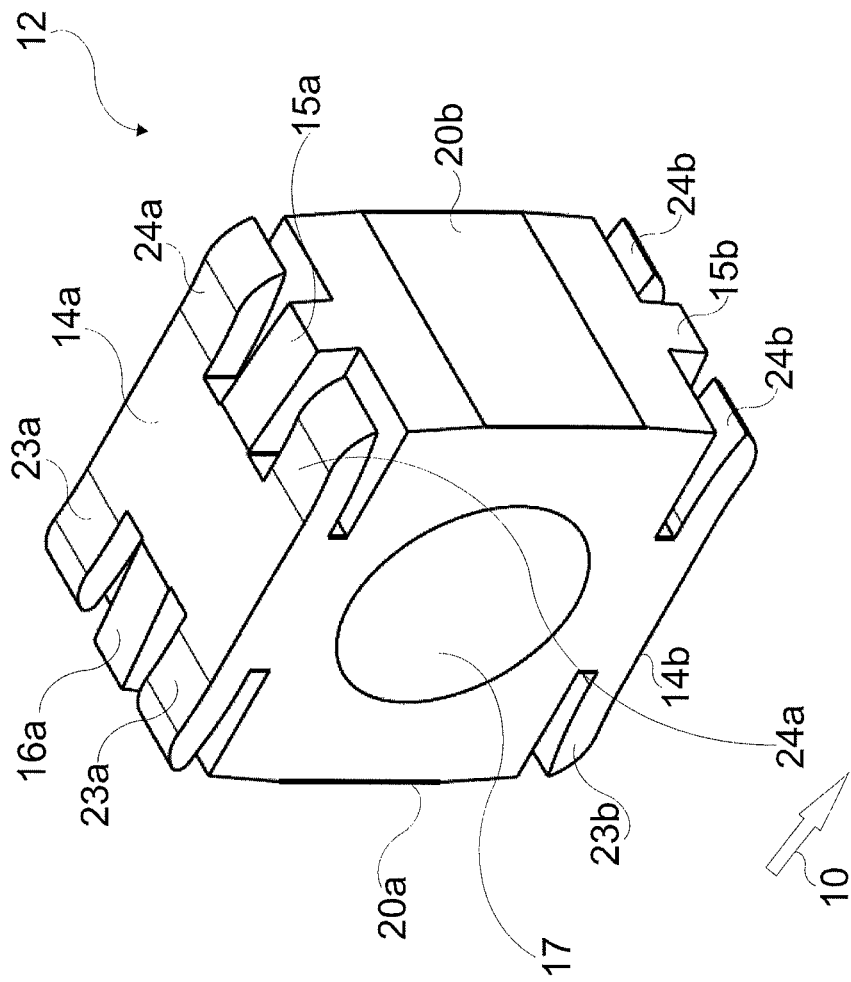
Figure 5:
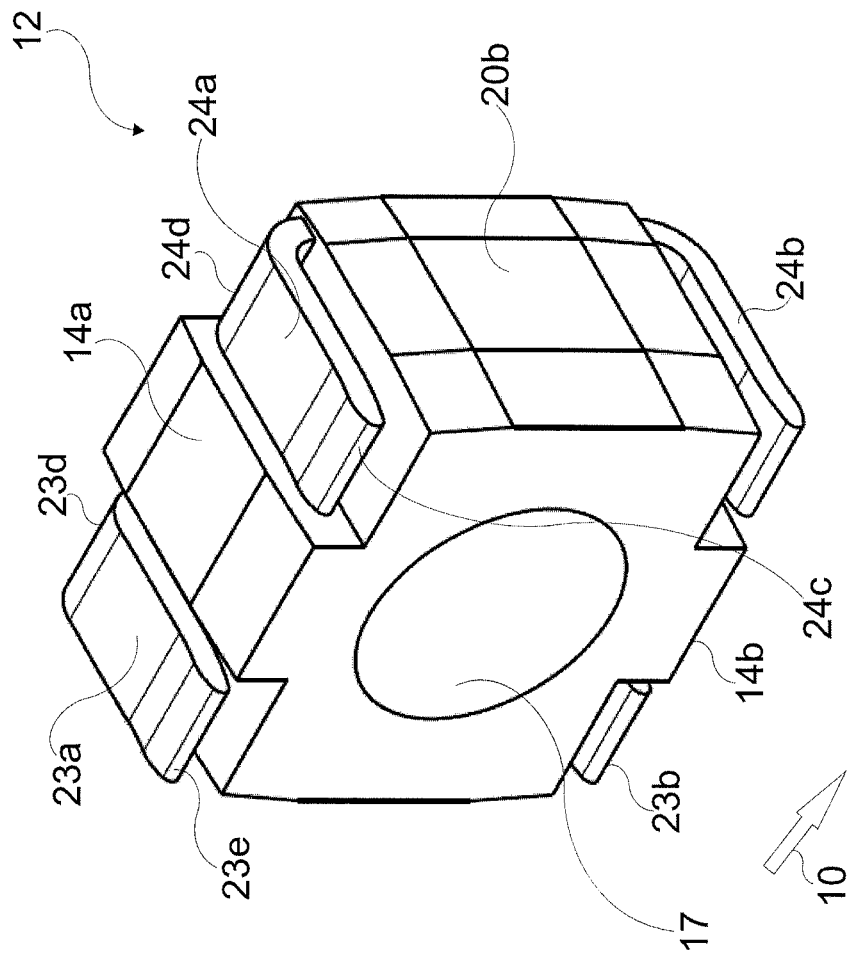
Figure 7A:
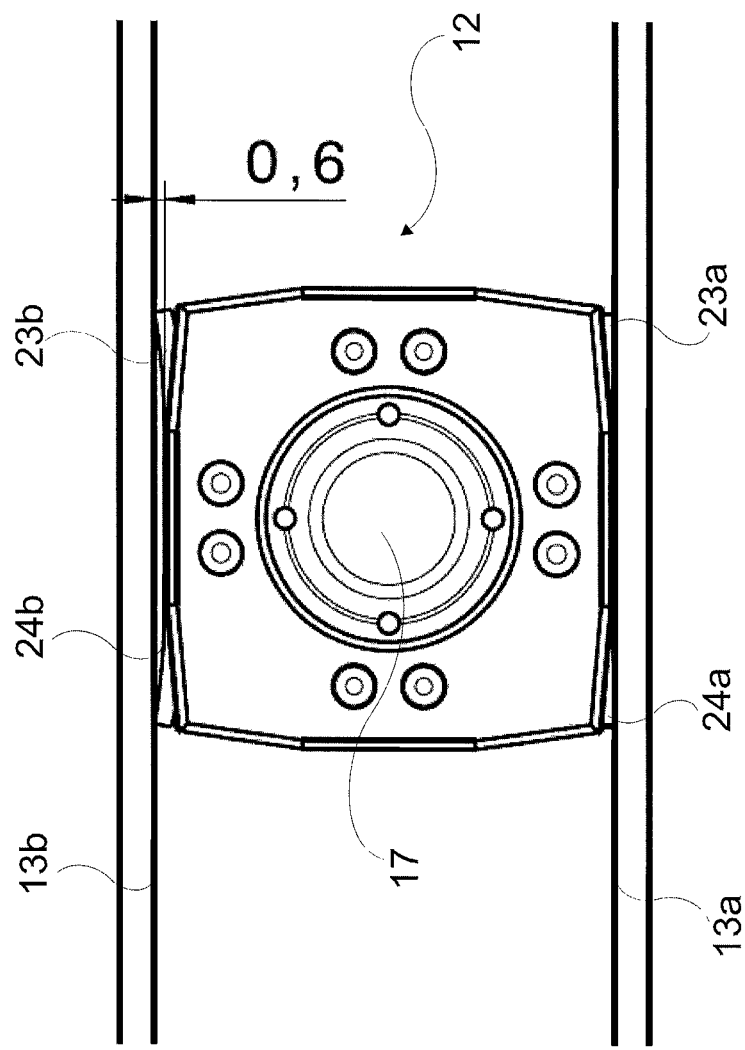
Figure 7B:
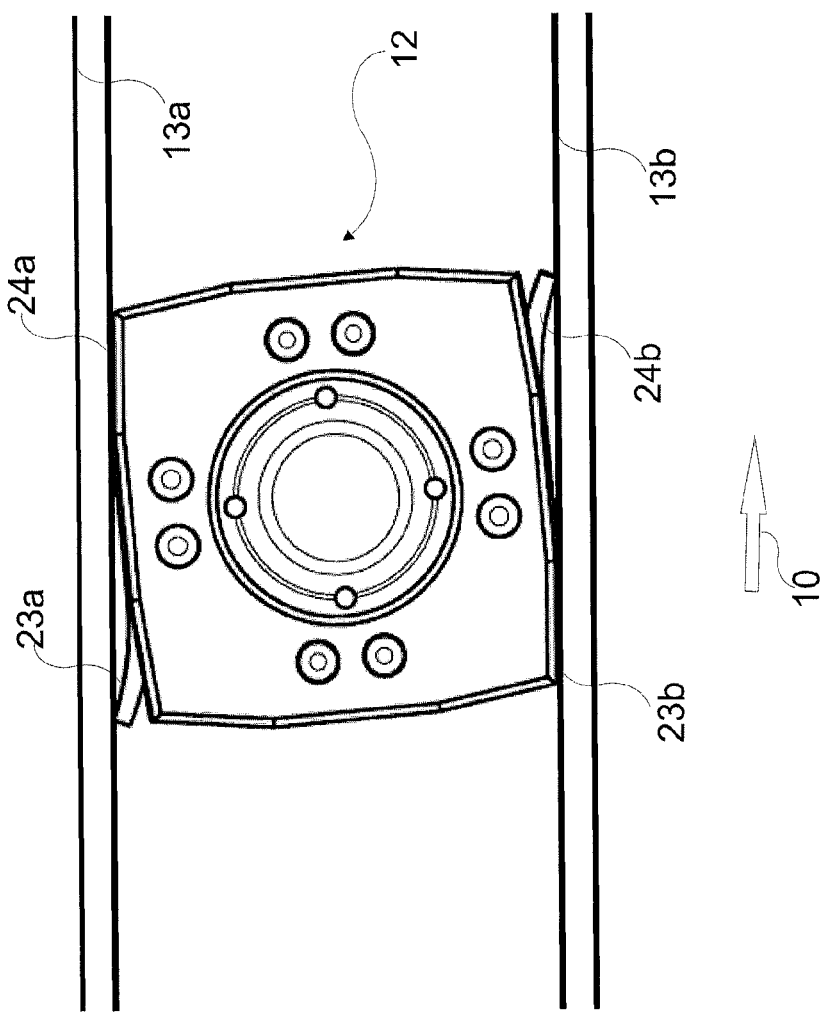
Figure 8A:
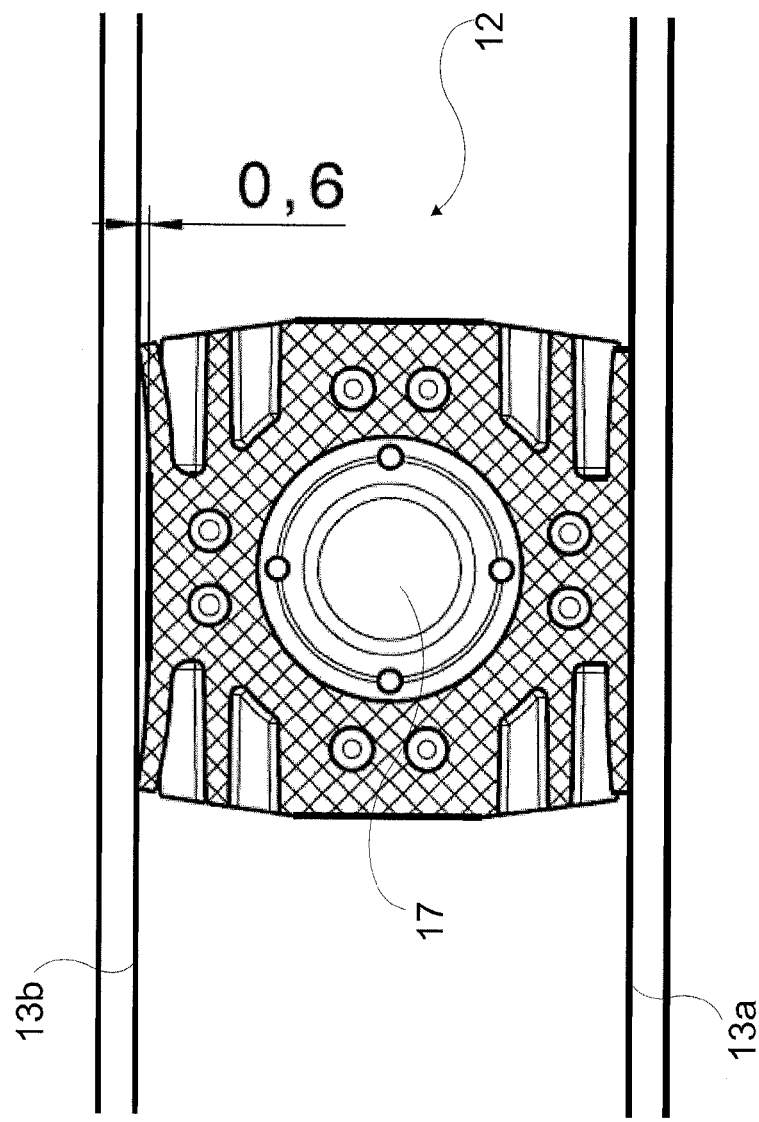
Figure 8B:
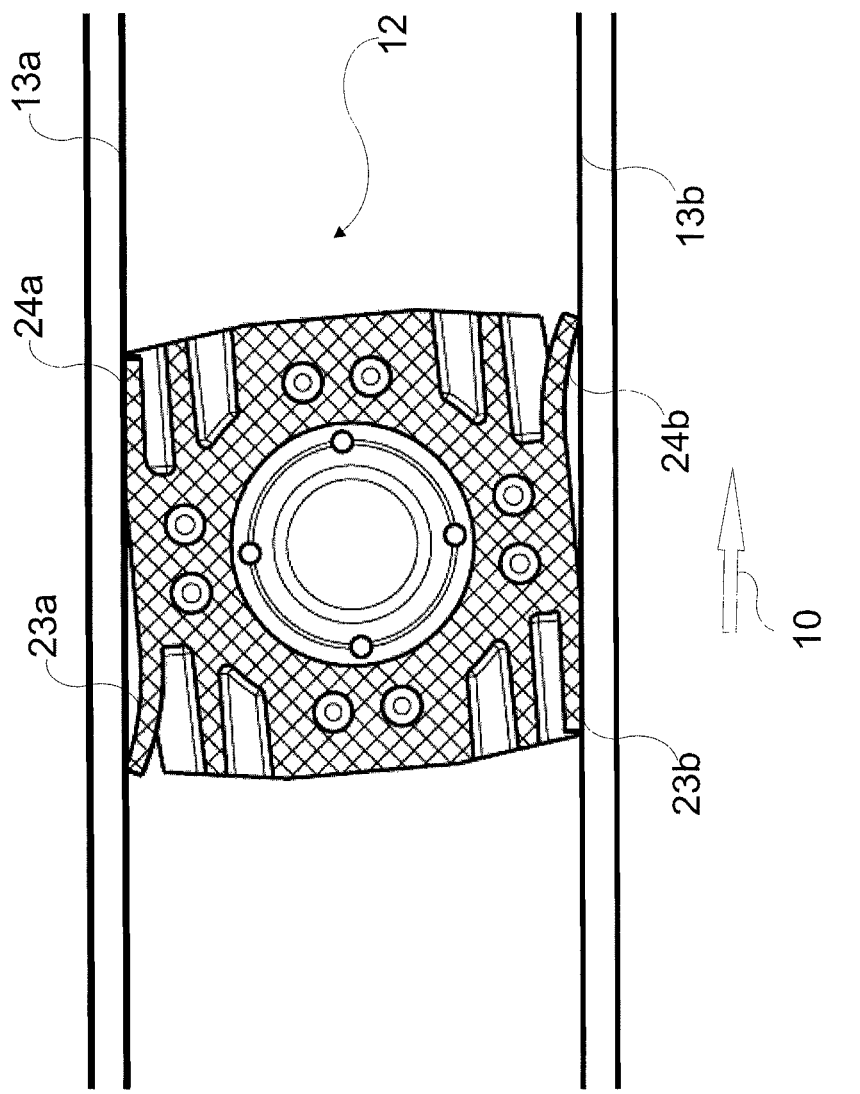

Advantages and suitable features are described in the description below in connection with the drawing. This shows:

FIG. 1 in a diagrammatic view a vehicle seat with a slide element according to the present invention and an extract from the vehicle seat;

FIG. 2 in a perspective view the slide element for a vehicle seat according to a first embodiment of the invention;

FIG. 3 in a perspective view the slide element for a vehicle seat according to a second embodiment of the invention;

FIG. 4 in a perspective view the slide element for a vehicle seat according to a third embodiment of the invention;

FIG. 5 in a perspective view the slide element for a vehicle seat according to a fourth embodiment of the invention;

FIG. 6 in various views the slide element according to the first embodiment of the invention;

FIGS. 7*a*, 7*b* in a side view the slide element for the vehicle seat according to the first embodiment of the invention with two different angle positions of the slide element;

FIGS. 8*a*, 8*b* in a cross section view the slide element shown in FIGS. 7*a*, 7*b* for the vehicle seat according to the first embodiment of the invention with two different angle positions of the slide element.

FIG. 1 shows in a diagrammatic side view a vehicle seat 1 together with the slide element according to a first embodiment of the invention, also in extract view.

The vehicle seat 1 comprises the seat part 2 and a back rest 3 and has a seat frame 4 which is arranged between a seat upper part composed of the seat part 2 and back rest 3 and an upper frame-like section which also has a guide rail 7, and a seat lower part which can also be constructed frame-like or from two separate rails 11 and amongst others contains a guide rail 8.

The seat frame 4 also comprises two scissor arms 5, 6 which are connected rotatably together by means of an axis 9 preferably running transverse to the vehicle seat direction or seating direction of the person using the vehicle seat.

The scissor arms 5, 6 at their rear ends or—viewed in the image plane—at their right-hand end are firmly connected with the seat lower part rail 11 and a portion of the seat upper part to which the guide rail 7 belongs. They can be displaced alternately in the displacement direction 10 and against the displacement direction 10. A fixed catch is preferably arranged at least at the right or rear end of the scissor arm 6. A front end 5a and 6a of the scissor arms 5, 6 according to the invention is connected with slide elements 12 and can be displaced, by means of the slide elements preferably made of plastic with a high hardness, in the displacement direction 10 or against the displacement direction 10. This is necessary if the seat is to have a height adjustment, i.e. the two scissors arms deflect up or down and thus are also displaced in the direction of the displacement direction or against the displacement direction by means of the slide elements.

In FIG. 1 in extract view A, the slide element is shown inside the guide rail 7 in enlarged view. It is clear from this depiction that the slide element with its upper surface and lower surface slides along the slide faces 13a, 13b of the guide rail when it is displaced forward and back or—viewed in the image plane—to left and right.

FIG. 2 shows a perspective view of the slide element preferably made from hard plastic in order to have good sliding properties against the guide rails 7, 8 which are preferably made of metal. The slide element 12 which has a substantially cuboid-shaped form has first surfaces 18 arranged sliding at the top and bottom along slide faces of the guide rails, and the surfaces 19 arranged at the front and back viewed in the vehicle seat direction.

The perspective view of the slide element shown in FIG. 2 for a vehicle seat according to the first embodiment of the invention shows that the first surfaces 18 with a first end 18a and second end 18b have a central first face 14a, 14b which—if the vehicle seat is currently horizontally oriented—is also oriented horizontally. Starting from this central first faces 14a, 14b viewed in displacement direction 10, a second face 16a, 16b is arranged after the first face 14a and constitutes a chamfer on the cuboid-shaped element and thus starting from the first face 14a slopes in the direction of the first end 18a of the first surface 18.

A third face 15a, 15b is also provided which—viewed in displacement direction—is arranged before the first face 14a and starting from the first face 14a slopes in the direction of the second end 18b of the first surface 18.

By the formation of these three faces 14a, 15a and 16a, and 15b and 16b, it is advantageously achieved that the slide element can rotate slightly about an axis mounted in a recess 17 of the slide element during the displacement movement without seizing inside the guide rails which are formed preferably of U-shaped cross section or being blocked in these guide rails. Then by a twist due to the slide force in the horizontal direction, the slide element slides on faces 16a and 16b as well as on the diagonally opposed faces on the bottom during a forward displacement movement in the displacement direction 10 and slides on faces 15a and 15b as well as on the diagonally opposed lower faces during a displacement movement against the displacement direction 10. Thus sliding between two slide surfaces 13a and 13b of the guide rails and the slide element 12 is always reliably ensured while retaining a slight clearance or distance or range between the slide surfaces of the guide rail and the surfaces 18 of the slide element.

Also the slide element has wing-like pressure force elements or pre-tension elements 23a and 24a which can be arranged on the top and also on the bottom of the slide element, naturally in this case pressing down. The wing-like pressure force elements 23a, 24a, 24b are designed such that they are arranged centrally between the two faces 16a, 16b and 15a, 15b. The pressure force elements 23a, 24a, 24b have free ends 23c, 24c which preferably tilt upwards arcuated-like in the case of pressure force elements 23a, 24b in order to press against an inside of the guide rail not shown here in detail. In contrast the free end of the pressure force element 24b and a second pressure force element not shown here point downwards in order to press against a lower inner side of the guide rail. This ensures that the slide element is constantly in contact with the inner upper and lower sides of the guide rail, irrespective of the momentary direction of tilt of the slide element—viewed in the longitudinal direction of the guide rail. It is also ensured in particular that by the constant contact of the wing-like pressure force elements with the guide rail, no rattle of the slide element can occur inside the U-shaped guide rail even if the slide elements belong to a passenger seat which is presently unoccupied and the vehicle is presently on an uneven road surface.

The wing-like pressure force elements at their other ends 23d, 24d lying opposite the free ends 23c, 24c are firmly attached to the main body of the slide element.

The slide element thus at the front and back, i.e. at the surfaces 19, has centrally located first sliding faces 20a and 20b which—when the slide element is installed in the guide rail twisted by 90°—allows the slide element to be used without pre-tensioning wing-like pressure force elements. This can be desirable for example if the resistance between the slide element and the guide rail is to be reduced during the slide movement.

FIG. 3 shows a second embodiment of the invention. The same and similar parts have the same reference numerals.

Once again a central first slide face 14a and front and rear slide faces 20a and 20b are present. In relation to the first embodiment shown in FIG. 2 of the invention, wing-like pressure force elements 23a and 24a extend over the entire width of the slide element so that there are no second and third faces 16a, 16b and 15a, 15b.

Advantageously also at the front and at the rear there are wing-like pressure force elements which extend over the entire width of the slide element, with reference numerals 25a, 25b, 26a and 26b. In this way the slide element 12 can be installed in the guide rail rotated by 90° since faces 18 and 19 are identical in structure. This helps avoid assembly errors which can occur when the slide element is accidentally not installed in the guide rail at the correct 90° angle.

FIG. 4 shows in perspective view the slide element for a vehicle seat according to a further third embodiment of the invention.

The same and similar components have the same reference numerals.

This depiction of the slide element according to the third embodiment of the invention shows that in this case wing-like pressure force elements 23a, 24a, 23b and 24b are each arranged in pairs before and after the central slide face 14a, 14b. This relates to the displacement direction 10 within the guide rail. By such a duplication of the pressure force elements 23a, 24a, 23b, 24b, it can be achieved that the slide element is less susceptible to lateral tilting i.e. tilting in a transverse direction oriented perpendicular to the displacement direction 10. At the same time, a second face 16a and a third face 15a, 15b are arranged between the pairs of pressure force elements 23a, 23b, 24a, 24b.

FIG. 5 shows in perspective view the slide element for a vehicle seat according to a fourth embodiment of the invention.

The same and similar components carry the same reference numerals.

Before and after the central first face 14a and 14b is arranged a wing-like pressure force element as a pre-tension element 23a, 24a, 23b and 24b. These pressure force elements are oriented such that their fixed ends 23a, 24d—viewed in the displacement direction 10—are arranged curved in the area of the left side of the slide element.

The free end 23c, 24c of these pressure force elements 23a, 24a in contrast runs in the direction of the right side of the slide element 12 and directed slightly upward.

Evidently between this wing-like pressure force element 23a, 24a and 24b and 23b, and the fixed part of slide element 12 above or below, is a slot-like gap to guarantee the spring effect of the tongue-like pressure force element by ensuring a corresponding clearance behind it.

Figure 6A:
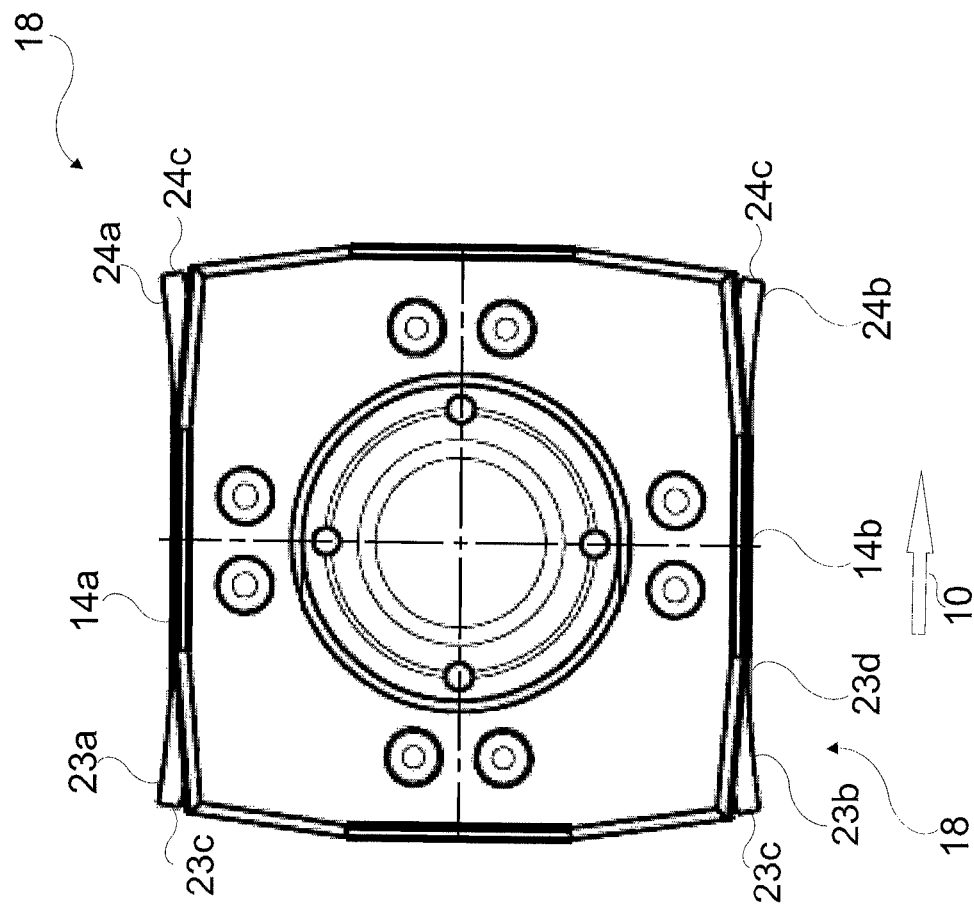

FIG. 6 shows in several views the slide element for the vehicle seat according to the first embodiment of the invention. Firstly FIG. 6a shows in a side view the slide element with central slide faces 14a, 14b and the tongue-like pressure force elements 23a, 24a, 23b and 24b. Opposite this, the other side view is shown in FIG. 6c.

Figure 6B:
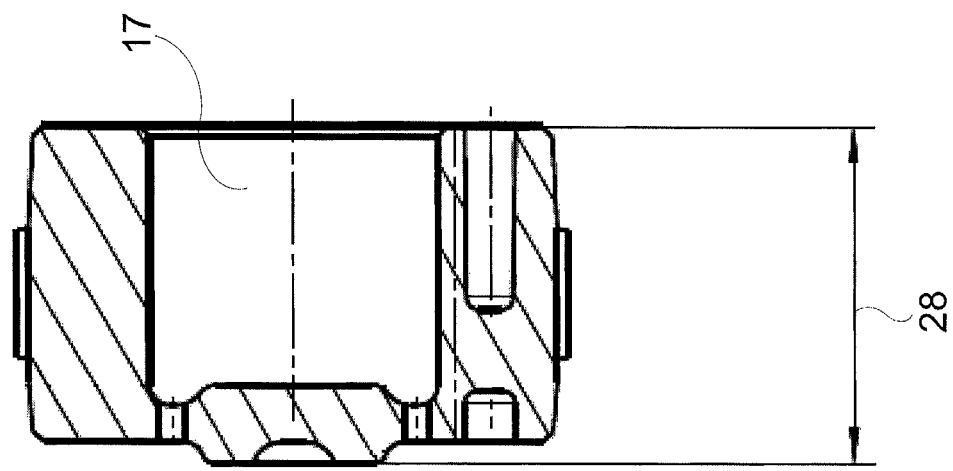

FIG. 6b in contrast shows a cross section through the slide element. This depiction clearly shows that in the recess 17, an axis can be arranged about which the slide element can be rotated.

Figure 6D:
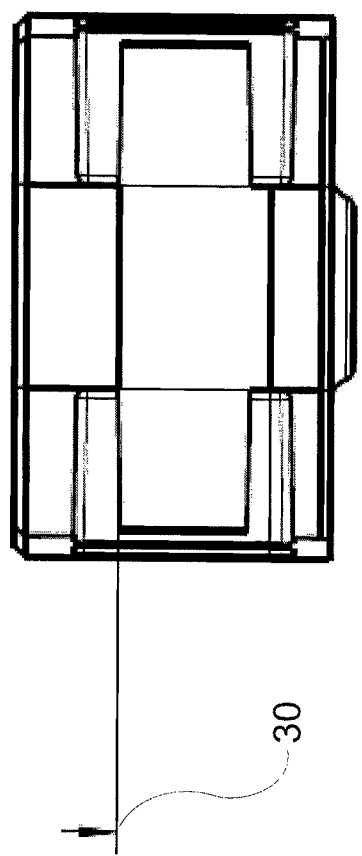

FIG. 6d shows a top view of the slide element shown in FIGS. 6a to 6c.

Such a slide element in its edge length 27 has for example a dimension of 15 to 45 mm, preferably 20 to 30 mm. The slide element can have a width 28 of for example 10 to 20 mm, preferably 14 to 17 mm.

The width 30 of the pressure force element is for example in a range of 2 to 10 mm, preferably a range of 5 to 8 mm.

FIGS. 7a and 7b show in two side views the slide element according to the first embodiment of the invention with two different angle depictions of the slide element.

The element is arranged inside the guide rail with an inner upper side 13a and an inner lower side 13b.

The pressure force elements 24a, 24b, 23a and 23b are pressed under pre-tension against the inner surfaces 13a and 13b of the guide rail and hold the slide element rattle-free within the guide rail even when the passenger seat is unoccupied.

FIG. 7b shows an angle view of the slide element 12 on displacement of the slide element against the displacement direction 10. This depiction shows that on such a slide movement of the slide element, the pressure force elements 23b and 24a are fully pressed in i.e. pressed against the slide element body. The pressure force elements 23a and 24b are however extended slightly further and despite this tilt position of the slide element continue to press against the inner sides 13a and 13b of the guide rail. This again ensures a constant contact of the slide element with the guide rail and a low-noise sliding and arrangement of the slide element within the guide rail.

FIGS. 8a and 8b show in a cross section view the slide element for the vehicle seat according to the first embodiment of the invention, again in two different angular depictions.

In FIG. 8a the slide element is in a rest position i.e. not in displacement. In this view a pressure-force contact of the slide element with the insides 13a and 13b of the guide rails is ensured and rattling of the slide element is prevented as a result.

FIG. 8b shows a slide movement of the slide element 12 within the guide rail. This takes place against the displacement direction 10.

FIG. 8b shows that the pressure force elements 23a and 24b under pre-tension are extended further than in a rest position of the slide element in order to compensate for the greater clearance in this area due to the tilt of the angle element and its angular position against the guide rail. At the same time, the pressure force elements 24a and 23b are also pressed substantially harder against the main body of the slide element 12 and ensure the possibility of sliding along the insides 13a and 13b of the guide rails.

All features disclosed in the application documents are claimed as essential to the invention where novel individually or in combination in relation to the prior art.

REFERENCE NUMERAL LIST

1 Vehicle seat
2 Seat part
3 Back rest
4 Seat frame
5 Scissor arm
5a Front end
6 Scissor arm
6a Front end
7 Guide rail
8 Guide rail
9 Axis
10 Displacement direction
11 Rails
12 Slide element
13a, 13b Slide faces
14a, 14b First faces
15a, 15b Third faces
16a, 16b Second faces
17 Recess
18 Surface
18a, 18b First end, second end
19 Surface
20a, 20b First slide faces
23a, 23b Pressure force elements
23c Free end
23d End
24a, 24b Pressure force elements
24c Free end
24d End
27 Edge length
28 Width
30 Width
31a, 31b Sloping surfaces

The invention claimed is:

1. A vehicle seat comprising: an upper part, a back rest, and a lower part, wherein between the upper part and the lower part is arranged a height-adjustable seat frame with at least two scissor arms connected rotatably together, wherein at least a first end of at least one of the two scissor arms is connected with at least one slide element for sliding displacement of the first end in at least one displacement direction along at least one guide rail, wherein the at least one slide element slides with at least two opposing first surfaces on slide surfaces of the at least one guide rail, wherein a first face is positioned in a middle section of each of the at least two opposing first surfaces, wherein the at least one slide element has at least one flexibly formed wing-like first pressure force element and at least one flexibly formed wing-like second pressure force element to exert a pressure force directed against the at least one guide rail, wherein viewed in the displacement direction the at least one first pressure force element is arranged after the first face and the at least one second pressure force element is arranged before the first face, and wherein the at least one second pressure force element extends in the displacement direction and the at least one first pressure force element extends against the displacement direction.

2. The vehicle seat according to claim 1, wherein the at least one slide element is at least one substantially cuboid-shaped element which slides on the slide surfaces of the at least one guide rail which has a U-shaped cross section profile.

3. The vehicle seat according to claim 1, wherein the at least one first and second pressure force elements constitute plate elements slightly curved in a longitudinal or transverse direction of the at least one guide rail, and wherein the at least one first and second pressure force elements have a free first end pressing against the at least one guide rail and a second end fixed to the at least one slide element.

4. The vehicle seat according to claim 1, wherein the at least two opposing first surfaces are structured such that each of the at least two opposing first surfaces, viewed in displacement direction, has at least one flat or arcuated second face arranged after the first face and at least one flat or arcuated third face arranged before the first face.

5. The vehicle seat according to claim 4, wherein the at least one second face and the at least one third face each border peripherally one of the at least one first and second pressure force elements.

6. The vehicle seat according to claim 4, wherein the at least one second face, viewed in displacement direction, runs slopingly from the first face towards a first end of the first surface, and wherein the at least one third face, viewed against the displacement direction, runs slopingly from the first face towards a second end of the first surface.

7. The vehicle seat according to claim 5, wherein the first and/or second and/or third faces viewed perpendicular to the displacement direction, starting from a middle section of the faces constitute or have, respectively, areas sloping towards edge areas of the first surface of the at least one slide element.

8. The vehicle seat according to claim 4, wherein the second and the third faces are arranged as flat faces with an angle from the range of 0.05° to 5.0° in relation to a plane of the slide surface of the guide rail.

9. The vehicle seat according to claim 1, wherein in an untensioned state the at least one first and second pressure force elements are arranged at least partly spaced at a distance of 0.3 to 3 mm, from a plane spanned by the first face, and wherein a free end of each of the at least one first and second pressure force elements is arranged pointing away from the slide element.

10. The vehicle seat according to claim 9, wherein in the untensioned state the at least one first and second pressure force elements are arranged at least partly spaced at a distance of about 0.6 mm from the plane spanned by the first face.

* * * * *

UNITED STATES PATENT AND TRADEMARK OFFICE
CERTIFICATE OF CORRECTION

PATENT NO. : 8,960,802 B2  
APPLICATION NO. : 13/305487  
DATED : February 24, 2015  
INVENTOR(S) : Frank Himmelhuber Page 1 of 1

It is certified that error appears in the above-identified patent and that said Letters Patent is hereby corrected as shown below:

IN THE CLAIMS:

In Claim 7, Column 10:

Line 13, delete the words "claim 5" and replace with the words -- claim 4 --.

Signed and Sealed this  
Eleventh Day of August, 2015

Michelle K. Lee  
*Director of the United States Patent and Trademark Office*